Dec. 10, 1929.  A. M. DUNCAN  1,739,218
BUMPER BAR
Filed June 28, 1928
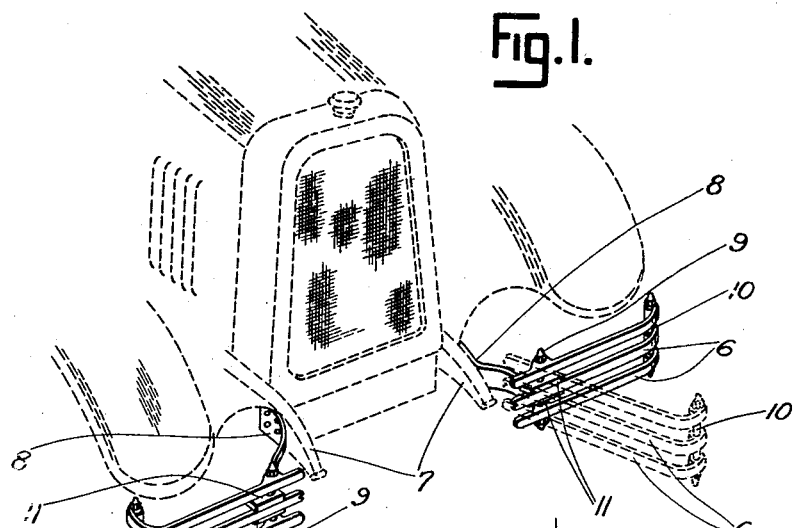
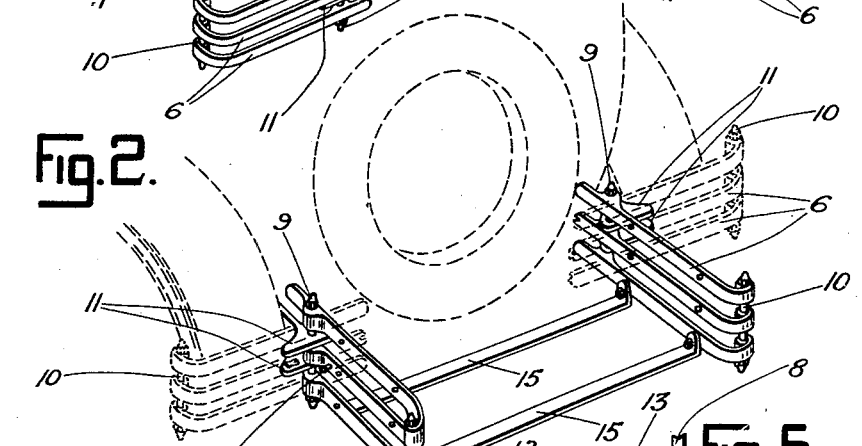
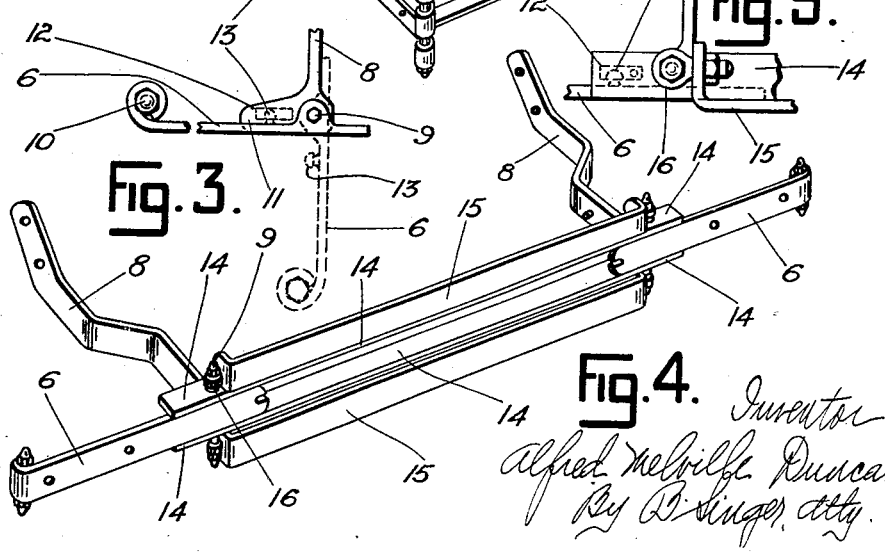
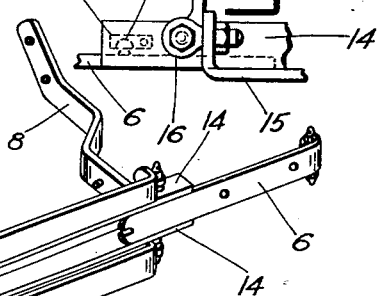

Patented Dec. 10, 1929

1,739,218

UNITED STATES PATENT OFFICE

ALFRED MELVILLE DUNCAN, OF CLOVELLY, NEAR SYDNEY, NEW SOUTH WALES, AUSTRALIA

BUMPER BAR

Application filed June 28, 1928, Serial No. 288,890, and in Australia August 8, 1927.

This invention relates to bumper bars for motor vehicles and has reference to bumper bars for attachment either at the rear or front of the vehicle.

It has been found that a number of the bumper bars at present in use project beyond the line of the wheels or mud-guards and in the case of the rear bars are liable to strike persons and objects when turning. It has been found that in congested areas difficulty has been experienced in parking the vehicle in small spaces owing to the extent to which the bumper bars extend, particularly when the wheels are locked. It frequently happens in cases of this nature that the bumper bars of one vehicle become locked in those of another vehicle, or catch against protruding objects.

An object of the present invention is to devise a bumper bar which will obviate the above disadvantages and enable a vehicle to be parked or turned with greater ease.

A further object is to provide a bumper bar which will yield to pressure brought to bear upon it from a direction opposite to that at which the bumper bar is normally to operate.

The invention resides more particularly in a bumper bar composed of sections hinged or pivoted to their supporting portions in such manner that they can be turned on their hinge or pivot through an angle of approximately 90° or less when desired, or automatically. For instance, automatic movement is desired when the front bumper strikes an object when the vehicle is moving backwards or when the rear bumper strikes an object when the vehicle is moving forward.

The following are examples of occasions when it is desired to move the hinged sections by hand. When limited parking space is provided; when it is desired to approach or leave a curbstone with the wheels locked; and when it is desired to use the hinged sections of the bumper bar to support luggage.

According to the invention the bumper bar is made of flat, round or other section steel bars which are formed into sections adapted to be pivoted to the chassis of the vehicle or to supporting brackets carried thereby. The bars constituting the bumper sections may be disposed vertically or horizontally or in any other convenient manner.

The bumper bar sections are hinged or pivoted in such manner that when fitted on the front of the vehicle they are rigid when encountered by an object in front thereof, and are capable of yielding on their pivots when encountered by an object in the rear thereof, as for instance the tire or other parts of another vehicle, when swinging backward towards a curbstone.

The bumper bar sections when fitted to the rear of the vehicle are similarly constructed to those at the front and are capable of relaxing if they strike an object when leaving the curbstone with the wheels locked.

When the bumper bar sections are folded back by hand they are adapted to be held by a retainer or catch.

But in order that the invention may be more readily understood, reference will now be made to the accompanying drawings.

Figure 1 is a perspective view of one form of hinged bumper bar, shown attached to the front of a motor vehicle, and showing in dotted lines, one section partly folded into the position it would assume when striking an object when the vehicle is being driven backwards.

Figure 2 is a perspective view of a bumper bar of the type illustrated in Figure 1 showing in dotted lines its normal position when applied to the rear of a motor vehicle, and showing in full lines the manner in which the hinged or pivoted sections may be turned by hand if it is desired to use them for supporting luggage.

Figure 3 is a detail plan view showing in full lines one of the bumper bar sections in its normal position, and by dotted lines the section turned to the external position upon its pivots.

Figure 4 is a perspective view showing the two hinged sections connected by transverse members.

Figure 5 is an enlarged detail view showing a suitable means for carrying supporting bars for use when the bumper sections are folded back into the position shown in Figure 2.

The hinged bumper bar sections may be formed with one or more flat, or round section bars 6 which are adapted to be connected to the chassis member 7 by a bracket 8 or the like.

The bars 6 are hinged to the brackets 8 by pivots 9 and as shown in Figure 1, may be coupled together at their ends by a pin 10.

The brackets 8 are provided with lugs 11 to which are attached a pair of spring clips 12 adapted to engage a knob 13 on one of the bars 6, see Figure 3, and prevent the bumper sections from turning upon their pivots 9 unless under action of applied force in a direction opposite to that at which the bumper is normally to operate.

In Figures 4 and 5 the hinged sections are formed of single flat bars 6 which are hinged to their respective brackets 8 by pivots 9. The brackets 8 are connected by strengthening members 14 through which the pivots 9 are passed. Parallel to the strengthening members 14 a pair of luggage supporting members 15 is mounted by means of eye bolts 16 disposed for convenience upon the pivots 9. The luggage supporting members 15 serve as an additional protection to the car when disposed in their normal position as shown in Figure 4 but when the hinged sections are turned into the corresponding position to that shown in Figure 2 the members 15 are placed to act as supports for luggage, as shown in Fig. 2.

In practice the hinged sections constituting the bumper bar are mounted at the front and rear of the vehicle, and would be operated automatically or by hand as occasion demanded.

I claim:

An improved bumper for motor vehicles comprising the combination with bumper bar sections composed of one or more bars, of pivots for each of said sections, brackets adapted to support said sections and pivots in hinged relationship, strengthening members connecting the brackets and detachable members adapted to act as luggage supporting members.

In testimony whereof I have hereunto set my hand.

ALFRED MELVILLE DUNCAN.